United States Patent
Ji et al.

[11] Patent Number: 6,125,638
[45] Date of Patent: Oct. 3, 2000

[54] OPTICAL FIBER COOLING PROCESS

[75] Inventors: Wenchang Ji, Doylestown, Pa.; Arthur I. Shirley, Piscataway, N.J.; Roger Meagher, Coburg, Australia

[73] Assignee: The BOC Group, Inc., Murray Hill, N.J.

[21] Appl. No.: 09/138,143

[22] Filed: Aug. 21, 1998

[51] Int. Cl.$^7$ ............................ F25D 13/06; F25B 25/00; C03B 37/10
[52] U.S. Cl. ................................. 62/63; 61/322; 65/510
[58] Field of Search .................. 62/63, 513, 434, 62/78, 265, 322; 65/510

[56] References Cited

U.S. PATENT DOCUMENTS

| | | | |
|---|---|---|---|
| 4,627,244 | 12/1986 | Willhoft | 62/63 |
| 5,377,491 | 1/1995 | Schulte | 62/63 |
| 5,452,583 | 9/1995 | Schulte | 62/63 |
| 5,568,728 | 10/1996 | Sapsford | 62/63 |
| 5,897,682 | 4/1999 | Koaizawa et al. | 65/489 |

*Primary Examiner*—William Doerrler
*Attorney, Agent, or Firm*—Philip H. Von Neida; Salvatore P. Pace

[57] ABSTRACT

Hot optical fiber being drawn from a preform is cooled in a helium cooled heat exchanger by a two-stage process. In the first stage, in which the rate of draw of fiber through the heat exchanger is increased to the design draw rate, the rate of flow of helium to the heat exchanger is increased as the rate of draw of fiber is increased. Helium is withdrawn from the heat exchanger by a variable speed blower, and during the first stage the rate of withdrawal of helium from the heat exchanger is controlled primarily by the rate of flow of helium into the heat exchanger, and during the second stage, the rate of flow of helium to the heat exchanger is maintained constant and the rate of withdrawal is determined primarily by the pressure in the heat exchanger.

30 Claims, 2 Drawing Sheets

OPTICAL FIBER COOLING PROCESS

FIELD OF THE INVENTION

This invention relates to the cooling of drawn fibers, and more particularly to the cooling of drawn optical glass fibers using a gaseous coolant. Specifically, the invention relates to control of the rate of gaseous coolant withdrawn from a glass fiber cooling chamber to minimize loss of coolant gas from the cooling chamber.

BACKGROUND OF THE INVENTION

Optical fibers are conventionally made from glass rods or "preforms" which have a central core of glass enveloped by a cladding of glass whose refractive index is lower than that of the glass core. The fibers are produced by heating the glass preform to softening temperature in a furnace and drawing fiber from the softened preform. The fiber is rapidly cooled sufficiently to enable a protective coating of resin material to be applied to the surface of the drawn fiber. The cooling is carried out by drawing the fiber through a draw tower with a heat exchanger wherein it comes into contact with a gas coolant, which is generally helium, although it can be other gases, such as nitrogen, carbon dioxide or hydrogen. The gas coolant is continually passed through the heat exchanger, generally in a crossflow or counterflow direction, relative to the direction of movement of the glass fiber through the heat exchanger. The gaseous coolant transfers heat from the glass fiber to a cooling medium, usually water, which passes through a compartment which surrounds the cooling chamber. Helium is the preferred coolant gas because it has good heat transport properties and is safe to use. Helium is costly relative to other gases, however, so it is desirable to recycle it for reuse in the heatexchanger.

One characteristic of currently practiced glass fiber cooling processes is that the openings through which the glass fiber enters and exits the cooling chamber are not gas tight. Because of this, air usually infiltrates the system and dilutes the gaseous coolant, which eventually makes it necessary to discard the coolant or purify it for reuse. Air infiltration can be reduced significantly by ensuring that there is a positive differential between the pressure in the cooling chamber and that in the surrounding environment. In other words, the pressure in the cooling chamber is maintained above that of the surrounding atmosphere. This has the disadvantage that valuable helium will be lost to the environment through the fiber inlet opening and/or the fiber outlet opening of the cooling chamber.

Efforts have been made to minimize the amount of helium efflux and air influx through the fiber inlet and outlet openings. U.S. Pat. Nos. 5,377,491 and 5,452,583 disclose a process and system for cooling optical fiber by cooling the fiber with a coolant gas, such as helium, in heat exchangers. This patent teaches controlling the flow of cooling gas into and out of the heat exchangers to limit air infiltration into the heat exchangers. The disclosed process involves the introduction of coolant gas into the heat exchangers at a pressure of about 0 to about 150 psig. Unfortunately, operating the heat exchangers at atmospheric or superatmospheric pressure results in a significant loss of coolant gas from the system, stated to be less than about 50%.

More economical processes for producing optical glass fiber are constantly sought. The present invention provides a process which reduces the cost of producing hot glass fibers by minimizing the amount of gaseous coolant lost to the environment during the fiber cooling process.

SUMMARY OF THE INVENTION

The invention provides a method of reducing the loss of gaseous coolant from an optical fiber cooling system by maintaining the flow of gaseous coolant into the cooling chamber of the system substantially constant and using a variable speed gas pumping means to control the rate of withdrawal of coolant from the cooling chamber. This enables the system to be operated at a slight vacuum, thereby significantly reducing the amount of coolant gas that escapes from the cooling chamber to the environment. The invention also provides a method of reducing the loss of gaseous coolant from the optical fiber cooling system during an initial stage of the cooling process, during which the flow of gaseous coolant into the cooling chamber and the rate of passage of fiber through the cooling chamber are gradually increased to the design rates, by adjusting the rate of withdrawal of gas from the cooling chamber in proportion to the rate of flow of coolant into the cooling chamber.

According to a broad embodiment, the invention comprises a method of cooling a hot drawn fiber in a heat exchange unit comprising: a cooling chamber having one fiber inlet opening, one fiber outlet opening, at least one cooling gas inlet and at least one cooling gas outlet; and a variable rate gas pumping means comprising the steps:

(a) passing the fiber through the cooling chamber;
(b) introducing gaseous coolant into the cooling chamber via the at least one cooling gas inlet; and
(c) withdrawing a gaseous exhaust stream comprising the gaseous coolant and at least one gaseous impurity from the cooling chamber by means of the variable rate gas pumping means at a flow rate such that the pressure in at least part of the cooling chamber is maintained between 0.5 bara and ambient pressure.

In a preferred embodiment, the sole function of the variable rate gas pumping means during periods of operation of the cooling process conducted in the cooling chamber is to withdraw said gaseous exhaust stream from the cooling chamber.

In another preferred embodiment of the invention, the gaseous coolant is introduced into the cooling chamber through a plurality of apertures. In another preferred embodiment, the gaseous exhaust stream is withdrawn from the cooling chamber through a plurality of apertures.

In another preferred embodiment, the gaseous exhaust stream is withdrawn from the cooling chamber through a plurality of conduits. The plurality of conduits can comprise a conduit in the upper region of the cooling chamber and a conduit in the lower region of the cooling chamber. In a preferred aspect of this embodiment, the gaseous exhaust stream is withdrawn through the conduits in the upper and lower regions of the cooling chamber at different rates. For example, the gaseous exhaust stream can be withdrawn through the conduit in the upper region of the cooling chamber at a more rapid rate than it is withdrawn through the conduit in the lower region of the cooling chamber.

The method is particularly suitable for cooling hot optical glass fiber.

In one preferred embodiment, the gaseous coolant introduced into the cooling chamber comprises helium, nitrogen, carbon dioxide, hydrogen or mixtures of these.

In another preferred embodiment, the gaseous exhaust stream is withdrawn from the cooling chamber at a rate such that the pressure in at least part of the cooling chamber is maintained between about 0.7 bara and ambient pressure.

In a more preferred embodiment, the gaseous coolant introduced the cooling chamber comprises at least 60% helium.

The atmosphere surrounding the cooling chamber is generally air.

In a preferred embodiment, the rate of withdrawal of gaseous exhaust stream from the cooling chamber is partially determined by the rate of flow of gaseous coolant into the cooling chamber.

The fiber is preferably drawn through the cooling chamber and the gaseous coolant is preferably introduced into the cooling chamber at substantially constant rates.

In a preferred embodiment of the invention, the method comprises a first period during which the fiber is drawn through said cooling chamber at an increasing rate and the gaseous coolant is introduced into the cooling chamber at an increasing rate, and a second period during which the fiber is drawn through the cooling chamber at a substantially constant rate and the gaseous coolant is introduced into the cooling chamber at a substantially constant rate.

In another preferred embodiment, the rate of withdrawal of gaseous exhaust stream from the cooling chamber is partially determined by the concentration of gaseous impurity in the gaseous exhaust stream.

Another preferred embodiment comprises removing at least part of the at least one gaseous impurity from the gaseous exhaust stream and recycling the impurity-depleted gaseous exhaust stream to the cooling chamber for use as gaseous coolant. Generally, the removal of at least part of the at least one gaseous impurity from the gaseous exhaust stream is carried out by a gas purification process selected from the group consisting of pressure swing adsorption, temperature swing adsorption, membrane separation, distillation or combinations of these.

When the at least one gaseous impurity comprises air, a preferred gas purification process is pressure swing adsorption process using a nitrogen- and oxygen-selective adsorbent. The cycle of the pressure swing adsorption process generally comprises an adsorption step, an equalization-depressurization step, a countercurrent depressurization step, an equalization-repressurization step and a repressurization step.

When the gas purification process is pressure swing adsorption, it is preferably carried out in an adsorption system comprising two or more adsorption vessels operated in parallel and out of phase. This arrangement is particularly useful when the feed gas to the adsorption system comprises gaseous exhaust streams withdrawn from two or more of the cooling chambers.

In another embodiment of the invention the two or more cooling chambers are operated out of phase and in batch mode, thereby producing the feed gas at a variable flow rate. In this embodiment, the duration of the adsorption step is preferably extended during periods when the feed gas is produced at lower flow rates and reduced during periods when the feed gas is produced at higher flow rate. Another preferred embodiment comprises adjusting the duration of the adsorption step in response to changes in the purity of the nonadsorbed gas product stream from the PSA system.

In a preferred embodiment of the invention, the gas purification process is carried out in an adsorption system comprising four adsorption vessels operated 90° out of phase. In this aspect, the duration of the adsorption step is preferably extended during a period when one vessel is undergoing the adsorption step, one vessel is undergoing the equalization-depressurization step, one vessel is undergoing the equalization-repressurization step and one vessel is undergoing the repressurization step. The repressurization step may comprise repressurizing the vessel with coolant gas-enriched product stream produced during adsorption steps of the process, the feed gas or combinations of these.

In another preferred embodiment, the fiber inlet opening and the fiber outlet opening are located at the top and bottom, respectively, of the cooling chamber.

BRIEF DESCRIPTION OF THE DRAWINGS

The same reference numerals are used to represent the same or similar parts in the various drawings.

DETAILED DESCRIPTION OF THE INVENTION

By virtue of the invention, gaseous coolant loss from the cooling chamber of a heat exchanger in which hot fibrous material is cooled by heat exchange with the gaseous coolant is minimized during a two-stage fiber cooling process. During the first stage of the process, the rate of flow of coolant into the cooling chamber is gradually increased as the rate of flow of the fiber through the heat exchanger is increased, and the rate of withdrawal of coolant from the cooling chamber is increased in proportion to the rate of increase of flow of coolant into the cooling chamber, so as to maintain the pressure in at least part of the cooling chamber below atmospheric pressure. During the second stage, the rate of flow of coolant into the cooling chamber and the rate of flow of fiber through the cooling chamber are maintained substantially constant, and the rate of withdrawal of coolant from the cooling chamber is adjusted as necessary to continue to maintain the pressure in at least part of the cooling chamber at subatmospheric pressure. Although the cooling gas may be introduced into the cooling chamber at atmospheric or superatmospheric pressure, the pressure at or near the cooling gas outlet(s) of the cooling chamber is maintained at subatmospheric pressure. Operating the system in this manner will ensure that cooling gas loss through the openings of the cooling chamber, for example, at the fiber inlet and/or outlet, is minimized or eliminated.

Figure 1:
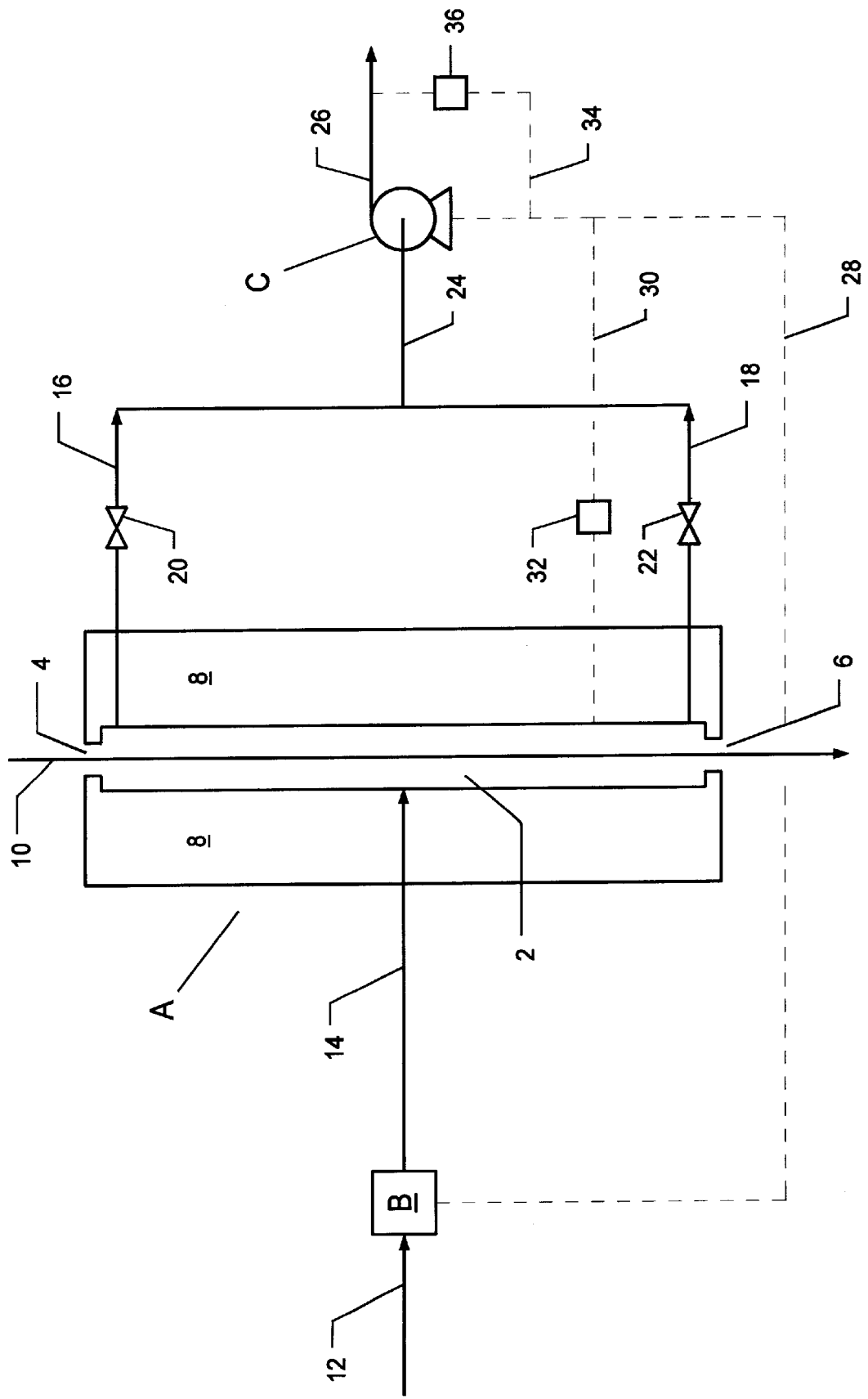
FIG. 1 is a schematic representation of a single unit system for practice of the process of the invention.

The invention can be more easily understood by reference to the appended drawings. Turning now to FIG. 1, illustrated therein is an optic fiber cooling system including a heat exchanger, A, a gas flow controller, B and a variable speed gas pumping means, C. Heat exchanger A is provided with fiber cooling chamber 2, having fiber inlet 4 and fiber outlet 6 and cooling water jacket 8. The heat exchanger is illustrated in operation with glass fiber strand 10 being drawn through chamber 2. The fiber is drawn from a preform softened in a furnace (not shown) that is positioned above fiber inlet 4. The fiber is drawn through the heat exchanger by means of a rotating spool (not shown) located below fiber outlet 6. Coolant gas supply line 12 is connected to the inlet end of gas flow controller B. The outlet end of flow controller B is connected via line 14 to cooling chamber 2. Coolant gas withdrawal lines 16 and 18 are connected to the top and bottom, respectively, of chamber 2. Lines 16 and 18 are provided with flow control valves 20 and 22, respectively. At their downstream ends, lines 16 and 18 are joined to line 24, which, in turn, is connected to the suction end of blower C. Exhaust gas discharge line 26 joins the discharge end of pumping means C to a downstream gas purification plant.

Heat exchanger A, gas flow controller B and gas pumping means C are conventional equipment, and details of their construction and operation form no part of this invention. Pumping means may be any pumping device suitable for moving gas from one point to another. Preferably pumping means C is a variable speed gas blower, and it will be hereinafter referred to as such.

Although the connection between line 14 and chamber 2 is depicted as a single line connected to the center of chamber 2, line 14 may be positioned anywhere along the extent of chamber 2, or a plurality such lines may be used to conduct cooling gas to chamber 2. Similarly, chamber 2 may be provided with a single coolant gas withdrawal line located at any point along the wall of chamber 2 or it may be provided with a plurality of exhaust gas withdrawal lines positioned along the extent of chamber 2. In one preferred arrangement, inlet line 14 is positioned at the fiber outlet end of chamber 2 and a coolant gas discharge line is positioned at the fiber inlet end of chamber 2 to provide coolant gas flow in a direction countercurrent to the direction of flow of fiber through chamber 2. In a more preferred arrangement (not shown), a series of coolant gas inlet apertures and/or a series of exhaust gas withdrawal apertures are positioned along the longitudinal extent of the wall(s) of chamber 2 to provide a uniform flow of gas into and/or out of chamber 2. When chamber 2 is provided with both a series of coolant gas inlet apertures and a series of exhaust gas withdrawal apertures the fiber passing through chamber 2 can be cooled by coolant gas flowing crosswise through chamber 2. In the arrangement illustrated in FIG. 1, valves 20 and 22 can be used to shut of flow in either of lines 16 and 18, or they can be used to adjust the relative rate of flow of gas through lines 16 and 18.

The speed control mechanism of pump C is connected to flow controller A through flow sensing control loop 28, to chamber 2 via pressure sensing control loop 30, which is provided with pressure sensor 32, and to line 26 via line impurity sensing loop 34, which is provided with a gaseous impurity sensor 36. Sensor 36 may be any device that can measure the concentration of a selected gaseous impurity. For instance, it may be an oxygen sensing device.

Figure 2:
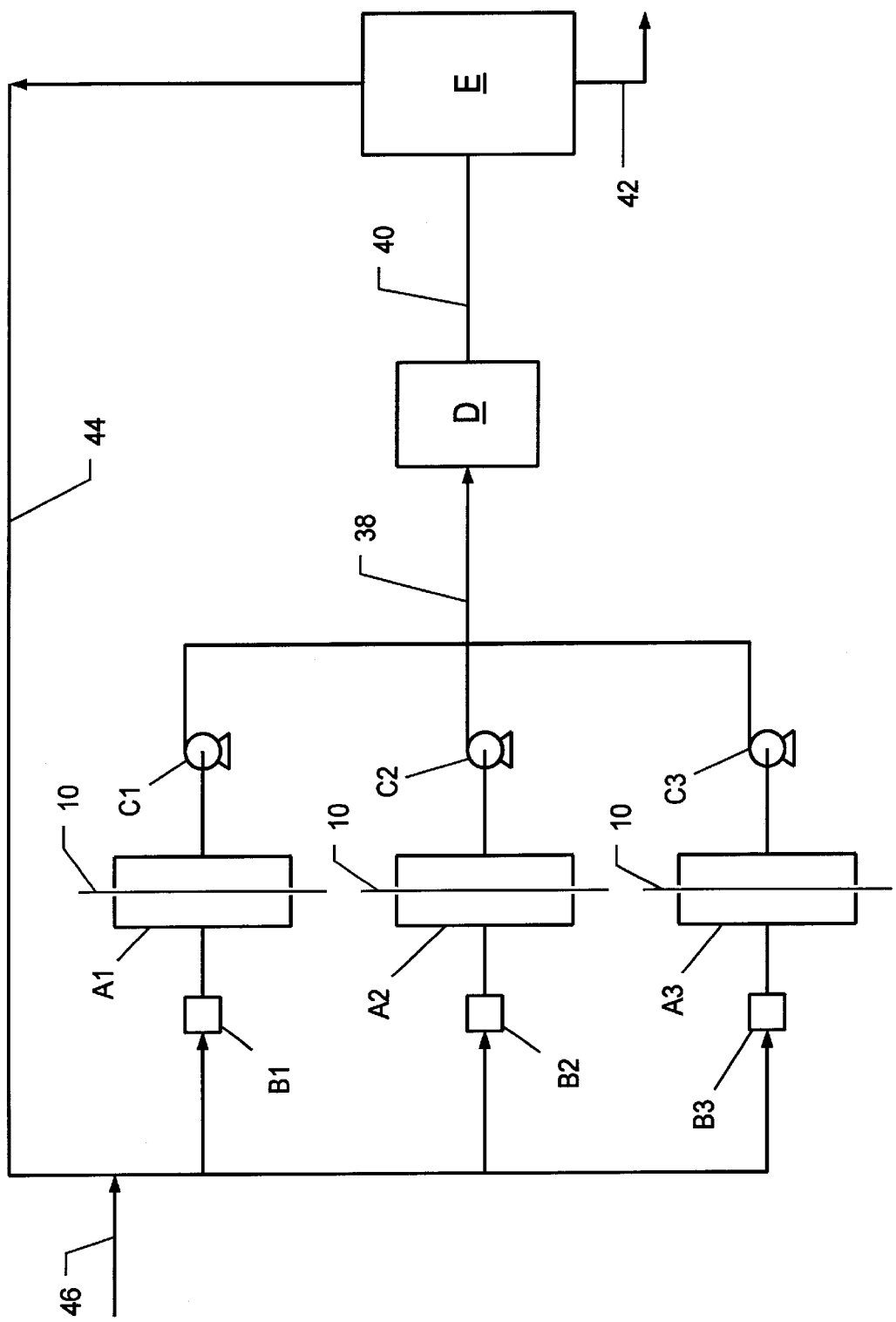
FIG. 2 is a schematic representation of a multiple unit system, including a gas purification plant.

FIG. 2 illustrates a multiple fiber cooling system comprised of three heat exchangers, A1–A3, each provided with a gas flow controller, B1–B3, respectively, and a variable gas blower, C1–C3, respectively. The discharge ends of pumps C1–C3 are connected to an optional gas storage vessel D via line 38. Line 40 connects vessel D to the inlet end of gas purification plant E.

Purification plant E may be any gas purification system capable of separating the gaseous coolant used in the process from gaseous impurities that infiltrate the gas cooling chambers of the system, such as air, carbon dioxide and water vapor. Suitable gas purification systems include adsorption plants, such as pressure swing adsorption (PSA) units, temperature swing adsorption (TSA) units, permeable membrane separation units, cryogenic distillation plants, etc. In a preferred embodiment, the gas purification system is a PSA plant, which, when used with an appropriate adsorbent efficiently and inexpensively removes gaseous impurities from the coolant gas.

Attached to gas purification plant E is a waste gas discharge line 42 and a purified coolant gas discharge line 44. Line 44 serves as a recycle line to return purified coolant gas to the inlets of heat exchangers A1–A3. Coolant gas makeup line 46 connects a source of fresh coolant gas to line 44.

In some cases, it may be desirable to use sealing means to limit infiltration of air and other gaseous impurities into the cooling chambers. These can be placed at openings 4 and 6 in the system illustrated in FIG. 1. Additionally or alternatively, fluid sealing means may be used to minimize air infiltration into cooling chamber 2. Suitable sealing fluids include nitrogen, argon, etc. Other means for sealing openings 4 and 6 may be employed. For example, the heating furnace used with the cooling tower may be used to form an air-tight seal around opening 4, and the downstream resin coating apparatus may be positioned adjacent opening 6 in a manner that seals this opening from the environment.

Generally, in the preferred embodiment, the optical fiber manufacturing process of the invention is carried out in two stages. The first stage comprises establishing the stable draw of fiber through a cooling chamber and onto a take-up spool and the flow of gaseous coolant through the cooling chamber. During this stage the rate of draw of fiber and the rate of flow of cooling gas through the cooling chamber are slow until steady draw of cooled fiber is established. When steady draw of fiber is established, the rate of fiber draw is increased, to the design draw rate. Typically this stage of the process lasts several minutes. During this period the rate of flow of coolant gas into the cooling chamber is likewise increased to ensure that the fiber is continually cooled to the desired extent. The second stage of the process begins when the design fiber draw rate and cooling gas flow rate through the cooling chamber are established. During the second stage the draw rate of fiber through the cooling chamber and the flowrate of coolant gas into the cooling chamber are maintained substantially constant. This stage of the process usually lasts for several hours.

Considering the process in more detail, the first stage of the process is initiated by establishing flow of coolant through the cooling chamber. At this time, one or both of valves 20 and 22 are open with the valve opening(s) adjusted to the desired extent. Next, an optical glass preform is heated to its softening point in a furnace positioned above heat exchanger A (FIG. 1). When the preform reaches the softening point it begins to flow, forming a fiber which is drawn into chamber 2 of heat exchanger A via opening 4. As the fiber passes downwardly through chamber A it contacts gaseous coolant that enters cooling chamber through line 14.

The gaseous coolant may be any gas that will not react with, or otherwise adversely affect, optical fiber. As indicated above, suitable coolant gases include such gases as helium, hydrogen, nitrogen, carbon dioxide and mixtures of these. The coolant gas may also be a mixture of gases, such as a mixture of helium and hydrogen, or helium and argon. It is not necessary that the gaseous coolant be completely free of impurities, such as oxygen, but, it is preferably that the cooling gas contain a high concentration of the desired coolant. The coolant gas preferably comprises about 60 volume percent or more of helium, and in the most preferred embodiment, the cooling gas comprises at least about 90% helium. Helium is preferred over other coolant gases because it is safe to use, has very good heat transport properties and is easily separated from other gases by conventional separation techniques. For ease of discussion, the coolant gas will be referred to as helium.

The helium entering heat exchanger A is cooled by the cooling medium circulating through compartment 8, which is usually water. As the helium passes through chamber 2 of heat exchanger A, it removes heat from the hot optical fiber, thereby stabilizing the fiber and permitting it to be drawn out of chamber 2 through opening 6.

The cooled fiber is subsequently coated with a layer of resin and wound on a take-up spool. The warmed or "spent" helium is withdrawn from chamber 2 through lines 16 and 18 (when both of these lines are in service) by blower C and preferably sent to a downstream processing system through line 26. Since helium has a low density it tends to flow upwardly as it passes through chamber 2. Accordingly, to optimize helium recovery and purity, it may be desirable to open valve 20 wider than valve 22 to accommodate the greater volume of helium in the top of chamber 2. In some cases, it may be desirable to close valve 22 altogether and to use only line 16 to withdraw exhaust gas from chamber 2.

To minimize loss of coolant gas, blower C withdraws gas from chamber 2 at a rate such that the pressure in at least part of chamber 2, e. g., at the coolant gas outlet(s) of chamber 2, is substantially maintained below atmospheric pressure, usually between about 0.5 bara (bar, absolute) and atmospheric pressure, and preferably between about 0.7 bara and atmospheric pressure. The term "substantially maintained below atmospheric pressure" means that although the pressure throughout chamber 2 may rise above atmospheric pressure for short periods of time, it is maintained below atmospheric pressure in at least part of chamber 2 for at least about 90% of the time that helium is passed through chamber 2.

A principal aim of the process of the invention is to prevent substantial loss of helium from the system without permitting large amounts of excess air to be drawn into chamber 2 and thereby dilute the helium. Operating the system below atmospheric pressure minimizes the loss of helium, but results in the infiltration of some air and other gaseous atmospheric impurities into chamber 2. Careful control of the pressure in chamber 2 to minimize loss of helium and air infiltration is greatly facilitated by using a variable speed blower whose speed is determined jointly by the rate of flow of helium into chamber 2, by the pressure in chamber 2 and, optionally, by the concentration of gaseous impurities in the gaseous effluent from the cooling chamber, in a manner that results in chamber 2 being maintained slightly below atmospheric pressure.

During the first stage of the process, the rate of withdrawal of spent helium from chamber 2 is primarily controlled by the rate of introduction of fresh helium into chamber 2. As the rate of introduction of helium into chamber 2 is increased, the speed of blower C is increased by an intermittent or steady signal from flow controller B, sent to the speed control mechanism of blower C. Control of the speed of blower C by flow controller B during the first stage of the process is preferable to control in response to a pressure change in chamber 2 because it permits response to an increase in the rate of influx of helium into chamber 2 before the occurrence of pressure buildup in chamber 2, and thus avoids or minimizes loss of helium during this period due to a temporary increase of the pressure in chamber 2 to superatmospheric pressure.

During the second stage of the process, flow controller B maintains the rate of flow of helium into chamber 2 substantially constant. During this period the speed of blower C is controlled by the pressure in chamber 2 through control loop 30. Pressure sensor 32 continuously or periodically monitors the pressure in chamber 2 via sensing loop 30 and sends signals to the speed control mechanism of pump C to adjust the speed of the pump, when necessary. Since, in general, pressure variations will result only from variations in the temperature in chamber 2 or from changes in the atmospheric pressure, changes in the speed of blower C will be relatively minor during this period.

Optionally, the rate of withdrawal may be controlled to maintain the concentration of gaseous impurities in the exhaust gas within a certain range. This is accomplished by means of impurity sensing loop 34. When this loop is activated, sensor 36 continuously or periodically monitors the exhaust gas to determine the concentration of impurities in the exhaust gas. When the air concentration in the exhaust gas moves outside the desired range, sensing device 36 sends a signal to pump C via loop 34 to adjust the speed of the pump to bring the air concentration back into the desired range.

When the invention is practiced with a battery of optical draw towers with each draw tower having an optical fiber cooling chamber, each cooling chamber will be serviced by a variable speed gas blower whose sole function during operation of the heat exchanger is to withdraw coolant gas from that chamber. A typical three-tower system using three separate variable speed pumps, pumps C1–C3, is illustrated in FIG. 2. Since each pump is controlled by a single flow controller and the pressure in only one cooling chamber, closer control of the pressure in the cooling chamber can be maintained.

In practicing the process of the invention in the multiple unit system illustrated in FIG. 2, gas discharged into line 38 by pumps C1–C3 is stored in optional storage vessel D. The stored gas can be intermittently or continuously fed to gas separation plant E for purification. In gas separation plant E the exhaust gas is separated into a waste gas stream, generally comprised substantially of air and other impurities and a purified helium stream, which exits separator E via line 44. The purified helium stream preferably contains 90% or more helium, although the system can be operated satisfactorily with lower purity helium streams. The purified helium stream is recycled to heat exchangers A1–A3 through line 44. Make-up helium is supplied to the system through line 46.

As indicated above, separator E can be any appropriate gas purification plant, but is preferably a PSA system. It may comprise a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing impurities, while one or more other units are undergoing regeneration to desorb the impurities. Operation of the adsorption systems of the invention is cyclical. In the preferred adsorption process, cycles are repeatedly carried out in a manner such that production of the purified helium is substantially continuous.

When separator E is a PSA system, the adsorption vessels are packed with an appropriate adsorbent in particulate form. Suitable adsorbents for the adsorption of nitrogen and oxygen include zeolites, such as zeolite 4A, zeolite 5A and zeolite 13X, and carbon molecular sieves. The particular adsorbent used in the adsorption process is a matter of choice and is not a part of the invention.

The adsorption vessels desirably contain a prepurification layer of desiccant, such as activated alumina or silica gel to remove water vapor contained in atmospheric air. Activated alumina is a preferred desiccant, since it also serves to remove carbon dioxide from the air, thereby reducing or eliminating the adsorption of carbon dioxide by the principal adsorbent. Alternatively, the system may contain a separate air prepurification unit to remove water vapor and carbon dioxide from the feed gas prior it its introduction into the adsorption vessels.

The temperature and pressure at which the PSA process is carried out are matters of choice and not critical. In general the adsorption process may be carried out at temperatures in the range of −50 to about 100° C., but are generally carried out at temperatures in the range of about 0 to about 40° C. Typically, the adsorption is carried out at a pressure at or above about 1 bar, absolute (bara). The minimum pressure at which the adsorption step is carried out is preferably about 2 and most preferably about 5 bara. The upper pressure limit is determined by economics and limitations of the adsorption system and, in general, it is desirably about 50 bara, preferably about 20 bara and most preferably about 15 bara. The pressure at which adsorbent regeneration is carried out is likewise a matter of choice, and the minimum pressure depends upon whether or not vacuum equipment is used to withdraw adsorbed gas from these vessels. Typically, the lower pressure limit during adsorbent regeneration in these vessels can be as low as 50 mbara (millibar absolute), but is preferably not lower than about 150 mbara, and is most preferably not lower than about 200 mbara. Adsorbent regeneration may be carried out at pressures as high as 5 bara, but is preferably carried out at pressures not higher than about 2 bara, and most preferably at pressures not above about 1 bara.

As noted above, optical fiber manufacturing processes are batch processes; accordingly each unit of a multiunit system will periodically be shut down to load a new preform into the unit. During the shut-down period, no spent helium will be generated in the shut down unit. Multiunit systems are usually operated out of phase so that when one unit is shut down, other units will be in operation and generate impurity-containing helium gas. When the system illustrated in FIG. 2 is operated with the three units functioning out of phase, the flow of impurity-containing helium gas to separator E will be variable. This situation is addressed in another embodiment of the invention by use of a PSA process having an adjustable cycle. The adsorption cycle of the PSA process of this embodiment includes an adsorption step, an equalization step, a depressurization or adsorbent regeneration step and a repressurization step. To compensate for the reduced rate of impurity-containing gas to the PSA system during periods when one or more optical fiber cooling units are shut down or are in the start-up period, the adsorption step of the cycle is extended for a period of time proportional to the reduction in volume of gaseous impurity introduced into the PSA system. Similarly, the adsorption step of the cycle can be shortened when additional fiber cooling lines are put into operation. This will permit the adsorbent beds to be operated substantially at optimum conditions. An adsorption cycle of a four-bed adsorption system operated in accordance with this embodiment of the invention, with each bed being operated 90° out of phase, is illustrated in Table 1. The steps of the cycle are: adsorption; first depressurization-equalizing step (Eq-Dep 1); second depressurization equalizing step (Eq-Dep 2); vent to atmosphere (Vent 1); evacuation (Vent 2); repressurization equalizing steps (Eq-Pre 1 and Eq-Pre 2) and repressurization with nonadsorbed product gas, feed gas or combinations of these (Repress).

TABLE 1

| Step | Bed A | Bed B | Bed C | Bed D | Time, sec. |
|---|---|---|---|---|---|
| 1 | Adsorption | Eq-Pre 1 | Vent 1 | Eq-Dep 1 | 30 |
| 2 | Adsorption | Eq-Pre 1 | Vent 2 | Eq-Dep 1 | 60 |
| 3 | Adsorption | Repress | Eq-Pre 2 | Eq-Dep 2 | 30 + t |
| 4 | Eq-Dep 1 | Adsorption | Eq-Pre 1 | Vent 1 | 30 |
| 5 | Eq-Dep 1 | Adsorption | Eq-Pre 1 | Vent 2 | 60 |
| 6 | Eq-Dep 2 | Adsorption | Repress | Eq-Pre 2 | 30 + t |
| 7 | Vent 1 | Eq-Dep 1 | Adsorption | Eq-Pre 1 | 30 |

TABLE 1-continued

| Step | Bed A | Bed B | Bed C | Bed D | Time, sec. |
|---|---|---|---|---|---|
| 8 | Vent 2 | Eq-Dep 1 | Adsorption | Eq-Pre 1 | 60 |
| 9 | Eq-Pre 2 | Eq-Dep 2 | Adsorption | Repress | 30 + t |
| 10 | Eq-Pre 1 | Vent 1 | Eq-Dep 1 | Adsorption | 30 |
| 11 | Eq-Pre 1 | Vent 2 | Eq-Dep 1 | Adsorption | 60 |
| 12 | Repress | Eq-Pre 2 | Eq-Dep 2 | Adsorption | 30 + t |

The duration of steps 3, 6, 9 and 12 depends upon the rate of feed of adsorbable gas impurity (air) to the adsorption system. A sensing device located upstream of the PSA plant continuously measures the concentration of air in the feed to the adsorption system. When all optical fiber cooling towers of the system are in operation and the volume of air being fed to the adsorption system is at the design level, the duration of the adsorption step of the cycle is 120 seconds. However, when one or more cooling towers are idled, the air measuring device senses that less air is fed to the PSA plant and sends a signal to the adsorption cycle control system which causes the duration of steps 3, 6, 9 and 12 to be extended for a period of time that is inversely proportional to the decrease in the impurity volume in the gas flow to the PSA plant. The purity of the nonadsorbed gas product leaving the PSA unit can also be used to control the operation of the PSA unit. For example, when the concentration of helium in the nonadsorbed gas product stream drops to a predetermined minimum acceptable value or rises to a predetermined maximum acceptable value, a signal from the sensing device monitoring the nonadsorbed gas product stream can direct the control mechanism of the PSA system to correspondingly shorten or lengthen the duration of the adsorption step of the PSA cycle. In preferred embodiments, the duration of the adsorption step is jointly controlled by the volume of gaseous impurity in the feed to the PSA unit and the purity of the nonadsorbed gas product stream leaving the PSA unit. When the idled cooling tower is put back into service, the flow of air to the PSA plant returns to the design level and the PSA cycle returns to normal.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE

This example illustrates 2-stage operation of an elongate, vertical optical fiber cooling chamber. During the first stage, which comprises periods 1–3 (see Table 2), the flow of coolant into the cooling chamber and withdrawal of exhaust gas from the cooling chamber were slowly increased. During the second stage, represented by period 4, the flow of helium into the cooling chamber and the withdrawal of exhaust gas from the cooling chamber were maintained substantially constant. The coolant stream, containing about 97% helium, was injected into the optical fiber cooling chamber via one helium inlet and withdrawn from the chamber through two coolant recovery ports, which were connected to a variable speed blower. The coolant recovery ports were located at the top and bottom of the cooling chamber. As the coolant injection rate increased from 40 to 70 standard liter per minute (slpm), the speed of the variable speed lower was increased correspondingly, to maintain pressure at the gas outlets of the cooling chamber at about −25 mm $H_2O$. Helium recovery and helium concentration in the recovered stream were maintained at about 85% and 60%, respectively. During the steady-state condition (period 4), the blower speed was adjusted as necessary to maintain the desired pressure in the cooling chamber. Helium recovery and helium concentration in the recovered stream are tabulated in Table 2.

TABLE 2

| Period | He Injection Rate (slpm) | Flowrate of Recovered Stream (slpm) | % He in Recovered Stream | % He Recovery |
|---|---|---|---|---|
| 1 | 40 | 60 | 59 | 89 |
| 2 | 50 | 72 | 59 | 85 |
| 3 | 60 | 82 | 62 | 85 |
| 4 | 70 | 91 | 65 | 85 |

This example shows that the helium concentration in the recovered stream is maintained between 59 and 65% and the helium recovery is maintained between 85 and 89% when the pressure at the gaseous coolant outlet end of the cooling chamber is maintained at about −25 mm $H_2O$. Helium recovery can be increased by operating the cooling chamber at a lower pressure.

Although the invention has been described with particular reference to specific equipment arrangements and to a specific experiment, these features are merely exemplary of the invention and variations are contemplated. For example, as noted above, the concentration of gaseous impurities in the exhaust coolant gas from the heat exchanger cooling chamber can be measured and used as a variable to assist in the control of the rate of withdrawal of exhaust gas from the cooling chamber. The scope of the invention is limited only by the breadth of the appended claims.

What is claimed is:

1. A method of cooling a hot drawn fiber in a heat exchange unit comprising: a single cooling chamber having one fiber inlet opening, one fiber outlet opening, at least one cooling gas inlet and at least one cooling gas outlet; and a variable speed gas blower, comprising the steps:

(a) drawing said fiber through said cooling chamber;

(b) introducing gaseous coolant into said cooling chamber via said at least one cooling gas inlet; and (c) withdrawing a gaseous exhaust stream comprising said gaseous coolant and at least one gaseous impurity from said cooling chamber by means of said variable speed gas blower at a flow rate such that the pressure in at least part of said at least one cooling chamber is maintained below atmospheric pressure.

2. The method of claim 1, wherein the sole function of said variable speed gas blower during periods of operation of said method is to withdraw said gaseous exhaust stream from said cooling chamber.

3. The method of claim 2, wherein said fiber is optical glass fiber.

4. The method of claim 3, wherein the gaseous coolant introduced into said cooling chamber comprises helium, nitrogen, carbon dioxide, hydrogen or mixtures of these.

5. The method of claim 4, wherein the gaseous coolant introduced into said cooling chamber comprises at least 60% helium.

6. The method of claim 5, wherein said at least one gaseous impurity comprises air.

7. The method of claim 6, wherein the rate of withdrawal of said gaseous exhaust stream from said cooling chamber is partially determined by the rate of flow of gaseous coolant into said cooling chamber.

8. The process of claim 7, wherein said fiber is drawn through said cooling chamber and said gaseous coolant is introduced into said cooling chamber at substantially constant rates.

9. The method of claim 8, comprising a first period during which said fiber is drawn through said cooling chamber at an increasing rate and said gaseous coolant is introduced into said cooling chamber at an increasing rate, and a second period during which said fiber is drawn through said cooling chamber and said gaseous coolant is introduced into said cooling chamber at substantially constant rates.

10. The process of claim 8, wherein the rate of withdrawal of said gaseous exhaust stream from said cooling chamber is partially determined by the concentration of gaseous impurities in said gaseous exhaust stream.

11. The method of claim 6, further comprising removing at least part of said at least one gaseous impurity from said gaseous exhaust stream and recycling the impurity-depleted gaseous exhaust stream to said cooling chamber as gaseous coolant.

12. The method of claim 11, wherein the removal of at least part of said at least one gaseous impurity from said gaseous exhaust stream is carried out by a gas purification process selected from the group consisting of pressure swing adsorption, temperature swing adsorption, membrane separation, distillation or combinations of these.

13. The method of claim 12, wherein said gas purification process is a pressure swing adsorption process using a nitrogen- and oxygen-selective adsorbent.

14. The method of claim 13, wherein the cycle of said pressure swing adsorption process comprises an adsorption step, an equalization-depressurization step, a countercurrent depressurization step, an equalization-repressurization step and a repressurization step.

15. The method of claim 14, wherein said pressure swing adsorption process is carried out in an adsorption system comprising two or more adsorption vessels operated in parallel and out of phase.

16. The method of claim 15, wherein the feed gas to said adsorption system comprises gaseous exhaust streams withdrawn from two or more of said cooling chambers.

17. The method of claim 16, wherein said two or more cooling chambers are operated out of phase and in batch mode.

18. The method of claim 17, wherein said feed gas is produced at varying flow rates.

19. The method of claim 18, wherein the duration of said adsorption step is extended during periods when said feed gas is produced at a reduced flow rate and shortened during periods when said feed gas is produced at an increased flow rate.

20. The method of claim 19, further comprising adjusting the duration of said adsorption step in response to changes in the purity of the nonadsorbed gas product stream from said PSA system.

21. The method of claim 18, wherein said adsorption system comprises four adsorption vessels operated 90° out of phase.

22. The method of claim 21, wherein the duration of said adsorption step is extended during a period when one vessel is undergoing said adsorption step, one vessel is undergoing said equalization-depressurization step, one vessel is undergoing said equalization-repressurization step and one vessel is undergoing said repressurization step.

23. The method of claim 22, wherein said repressurization step comprises repressurizing said vessel with gas-enriched product stream produced during adsorption steps of said process, said feed gas or combinations thereof.

24. The method of claim 1, wherein said gaseous coolant is introduced into said cooling chamber through a plurality of apertures.

25. The method of claim 1 or claim 24, wherein said gaseous exhaust stream is withdrawn from said cooling chamber through a plurality of apertures.

26. The method of claim 6, wherein said gaseous exhaust stream is withdrawn from said cooling chamber through a plurality of conduits.

27. The method of claim 26, wherein said plurality of conduits comprises a conduit in the upper region of said cooling chamber and a conduit in the lower region of said cooling chamber.

28. The method of claim 27, wherein said gaseous exhaust stream is withdrawn through said conduits in said upper and lower regions of said cooling chamber at different rates.

29. The method of claim 27, wherein said gaseous exhaust stream is withdrawn through the conduit in said upper region of said cooling chamber at a more rapid rate than it is withdrawn through the conduit in said lower region of said cooling chamber.

30. The method of claim 6, wherein said fiber inlet opening and said fiber outlet opening are located at the top and bottom, respectively, of said cooling chamber.

* * * * *